United States Patent
Hanjono et al.

(10) Patent No.: US 8,464,606 B2
(45) Date of Patent: Jun. 18, 2013

(54) SHIFT OPERATION DEVICE

(75) Inventors: Hiroshi Hanjono, Saitama (JP); Hiroto Shimazaki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 12/934,692

(22) PCT Filed: Mar. 27, 2009

(86) PCT No.: PCT/JP2009/056392
§ 371 (c)(1),
(2), (4) Date: Sep. 27, 2010

(87) PCT Pub. No.: WO2009/119851
PCT Pub. Date: Oct. 1, 2009

(65) Prior Publication Data
US 2011/0023646 A1    Feb. 3, 2011

(30) Foreign Application Priority Data
Mar. 28, 2008    (JP) .................. 2008-086479

(51) Int. Cl.
*G05G 1/04*    (2006.01)
(52) U.S. Cl.
USPC .............................................. 74/523; 74/519
(58) Field of Classification Search
USPC ...... 74/473.3, 473.33, 473.36, 519, 523–525, 74/543–548, 553–557, 473.1; 16/441; 180/336; 296/189
IPC ....... G05G 1/00,1/04, 1/10; F16H 59/04; B62D 1/06
See application file for complete search history.

(56) References Cited

U.S. PATENT DOCUMENTS

| | | | | |
|---|---|---|---|---|
| 3,071,023 | A * | 1/1963 | Herr et al. | 74/545 |
| 3,229,322 | A * | 1/1966 | Herr et al. | 16/441 |
| 3,561,281 | A * | 2/1971 | Wilfert | 74/473.3 |
| 3,707,095 | A * | 12/1972 | Uhlenhaut et al. | 74/473.3 |
| 3,750,492 | A * | 8/1973 | Holmes, Jr. | 74/523 |
| 3,795,156 | A * | 3/1974 | Neuscheler | 74/523 |
| 5,228,361 | A * | 7/1993 | Chazot et al. | 74/523 |
| 6,029,536 | A * | 2/2000 | Sugiyama | 74/473.31 |
| 6,082,216 | A * | 7/2000 | Watanabe et al. | 74/473.3 |
| 6,286,385 | B1 * | 9/2001 | Nishimura et al. | 74/473.3 |
| 7,272,988 | B2 * | 9/2007 | Meyer et al. | 74/473.3 |

(Continued)

FOREIGN PATENT DOCUMENTS

| | | |
|---|---|---|
| JP | 11-278085 A | 10/1999 |
| JP | 2002-029275 A | 1/2002 |
| JP | 2004-142651 A | 5/2004 |
| JP | 2006-256613 A | 9/2006 |

*Primary Examiner* — David M Fenstermacher
*Assistant Examiner* — Jake Cook
(74) *Attorney, Agent, or Firm* — Carrier Blackman & Associates, P.C.; William D. Blackman; Joseph P. Carrier (57) ABSTRACT

A shift operation device that has a simple structure and is provided with a lever knob that can absorb impact load that acts on the lever shaft in the axial direction. A core 11 is provided on the inside of the lever knob, and formed on the core 11 are screw cramps 11*b*, comprising cylindrical bosses, inside which are inserted screws that fix the core 11 to the lever shaft. V-shaped cut-out grooves 110 formed in the height direction of the cylindrical bosses are provided on the cylindrical parts 11*b*1 of the screw cramps 11*b* to reduce the thickness of the cylindrical parts 11*b*1, providing weak sites with response to the load that acts on the lever shaft in the axial direction.

14 Claims, 6 Drawing Sheets

U.S. PATENT DOCUMENTS 7,430,940 B2 * 10/2008 Kondou et al. .................. 74/537
7,997,548 B2 * 8/2011 Sugiyama et al. ....... 248/220.21
2002/0020242 A1 * 2/2002 Matsuno et al. ............. 74/473.3
2009/0193921 A1 * 8/2009 Ishizu et al. ................. 74/473.3

* cited by examiner

SHIFT OPERATION DEVICE

FIELD OF THE INVENTION

The present invention relates to a shift operation device having a lever knob which can absorb an impact load that is applied on the lever knob.

DESCRIPTION OF RELATED ART

To secure an interior space on the floor of a vehicle by arranging a shift operation device of a manual transmission or an automatic transmission in an instrument panel of the vehicle or its vicinity is widely carried out. However, such arrangement means that a shift lever of such device extends rearwardly toward occupants of the vehicle, and in the event of a collision, there is a risk that an occupant may come in contact with the shift lever. Therefore, it is advantageous to construct one or more portions of the shift operation device to be breakable, in the event that it receives a predetermined amount of force during an impact, in order to avoid or minimize personal injury to occupants during a collision.

For example, a technology for absorbing an impact load is disclosed in a Patent Literature 1, where in order to absorb the impact load input to a shift operation device (operation lever) which is arranged in an instrument panel or its vicinity, a slit is disposed in a bracket supporting the whole shift operation device to support thereof with a support member, and, for example, if the impact load is applied on the shift operation device, the shift operation device slides along the slit, while breaking the support member, to absorb the impact load.

Patent Literature 1: Japanese Patent Laid-Open Publication No. 2002-029275 (see paragraphs 0021 to 0023)

DISCLOSURE OF THE INVENTION

Problems to be Solved by the Invention

However, in the technology disclosed in the Patent Literature 1, a structure that slides the shift operation device along the slit when an impact load is applied is required, thereby resulting in increase in production cost due to increase in the number of components and decrease in production efficiency due to increase in complexity of the structure.

In addition, due to the requirement of the structure that slides the shift operation device along the slit, downsizing of the shift operation device and the bracket is limited.

It is, therefore, an object of the present invention to provide a shift operation device provided with a lever knob which can absorb an impact load operating in the axial direction of a lever shaft with a simple structure.

SUMMARY OF THE INVENTION

In order to solve the forgoing problems, according to a first aspect of the present invention, there is provided a shift operation device which includes a lever shaft supported by a vehicle, a lever knob provided in an upper end portion of the lever shaft, a core provided inside the lever knob and fixed to the upper end portion of the lever shaft, a connection member for fixing the core to the lever shaft, and a hollow portion which is provided on an upper side of the lever shaft than the connection member and inside the core. An outer periphery portion of the core is formed to be thin by disposing the hollow portion. A first weak portion to which a load caused by a deformation of the outer periphery portion is applied is formed between the hollow portion and the connection member of the core. The outer periphery portion is deformed by a load operating in an axial direction of the lever shaft.

In the first aspect of the present invention, an impact load can be absorbed through breaking of the weak portion utilizing the hollow portion by disposing the first weak portion, which is weak against a load operating in the axial direction of the lever shaft, in the core of the lever knob provided in the upper end portion of the lever shaft.

According to a second aspect of the present invention, there is provided the shift operation device, in which the connection member comprises a screw, and the core comprises a cylindrical boss into which the screw is inserted in a direction perpendicular to the axial direction of the lever shaft and a sidewall standing in a height direction of the cylindrical boss and forming the hollow portion. The cylindrical boss and the sidewall are formed in line in the axial direction of the lever shaft and a cylindrical portion of the cylindrical boss and the sidewall are connected by a stiffening rib, and the first weak portion is disposed in a connection portion between the cylindrical portion and the stiffening rib.

In the second aspect of the present invention, in the core, the cylindrical boss into which the screw of the connection member is inserted and the sidewall forming the hollow portion are formed in line in the axial direction of the lever shaft and connected by the stiffening rib, and the first weak portion is disposed in the connection portion between the stiffening rib and the cylindrical boss. Using this structure, a stress by a load operating in the axial direction of the lever shaft can be focused in the first weak portion, and thereby the first weak portion can be easily broken.

According to a third aspect of the present invention, there is provided the shift operation device, in which the core is provided with a second weak portion which is weak against a load operating in the axial direction of the lever shaft in the outer periphery portion of the core forming a surrounding of the hollow portion.

In the third aspect of the present invention, the second weak portion which is weak against a load operating in the axial direction of the lever shaft is disposed by forming a thin portion in the outer periphery portion of the core forming a surrounding of the hollow portion, and thereby an impact load can be absorbed through breaking of the second weak portion.

According to a fourth aspect of the present invention, there is provided the shift operation device, in which the core is provided with the second weak portion by forming a concave groove in the outer periphery portion on each of right and left sides of the hollow portion.

In the fourth aspect of the present invention, the core is provided with the second weak portion by forming the concave groove in the outer periphery portion on each of right and left sides of the hollow portion. Due to this structure, the core easily expands to right and left to be broken, and the first weak portion can be formed to easily expand to right and left to be broken, accordingly.

According to a fifth aspect of the present invention, there is provided the shift operation device, in which the core is provided with the second weak portion by forming a concave groove along a standing direction of the sidewall in the outer periphery portion on each of the right and left sides of the hollow portion.

In the fifth aspect of the present invention, the core is provided with the second weak portion by forming the concave groove along the standing direction of the sidewall in the outer periphery portion on each of the right and left sides of the hollow portion. Due to this structure, the core easily expands to right and left to be broken, and accordingly, the first weak portion can be formed to easily expand to right and left to be broken.

According to a sixth aspect of the present invention, there is provided the shift operation device, in which a thin portion which is weak against a load operating in the axial direction of the lever shaft is disposed in a connection portion between the sidewall and the outer periphery portion.

In the sixth aspect of the present invention, the thin portion can be formed in the connection portion between the sidewall and the outer periphery portion of the core. The thin portion forms a weak portion which is weak against a load operating in the axial direction of the lever shaft, and can form an origin of breaking of the core.

According to a seventh aspect of the present invention, there is provided the shift operation device, in which a space portion which is weak against a load operating in the axial direction of the lever shaft is disposed by emptying a part of the outer periphery portion.

In the seventh aspect of the present invention, the space portion can be formed by emptying a part of the outer periphery portion. The space portion is weak against a load operating in the axial direction of the lever shaft, and can form an origin of breaking of the core.

According to an eighth aspect of the present invention, there is provided the shift operation device, in which a groove portion which is weak against a load operating in the axial direction of the lever shaft is disposed on an outer wall surface of the outer periphery portion.

In the eighth aspect of the present invention, the groove portion can be formed on the outer wall surface of the outer periphery portion. The groove portion forms a weak portion which is weak against a load operating in the axial direction of the lever shaft by forming the outer periphery portion to be thin, and can form an origin of breaking of the core.

According to the present invention, the core can be easily broken through deformation in the right and left direction due to extension of the hollow portion and the weak portions by forming the core to easily expand to right and left due to the hollow portion. Accordingly, a shift operation device provided with a lever knob which can absorb an impact load operating in the axial direction of the lever shaft can be provided with a simple structure.

In addition, a structure such as a shift button may be arranged in the hollow portion.

DESCRIPTION OF REFERENCE CHARACTERS

1 Lever knob
5 Lever shaft
10 Outer
11 Core
11a Hollow portion
11a1 Sidewall (outer circumferential portion)
11b Screw cramp portion (cylindrical boss)
11b1 Cylindrical portion
11c Insertion portion
11d Stiffening rib
11e Exterior portion (outer periphery portion)
11e1 V-shaped groove (second weak portion, concave groove)
11f Thin portion
11g Space portion
11h Groove portion
11s Outer wall surface
13 Screw (fixing member, screw member)
100 Shift operation device
110 Cut-out groove (first weak portion)
T Vertex portion
P Load

DETAILED DESCRIPTION OF THE PREFERRED EMBODIMENT

Hereinafter, a preferred embodiment of the present invention will be explained in detail by referring to drawings as appropriate.

Figure 1A:
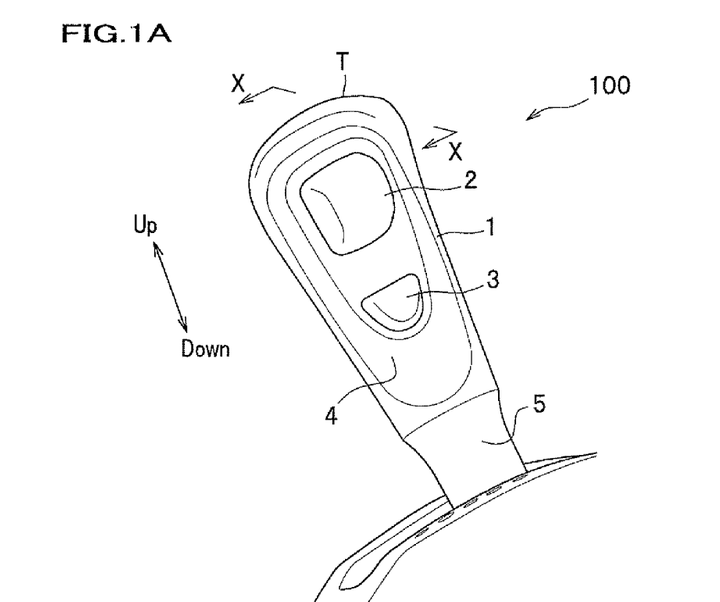
FIG. 1A is a perspective view of an outer appearance of a shift operation device.
Figure 1B:
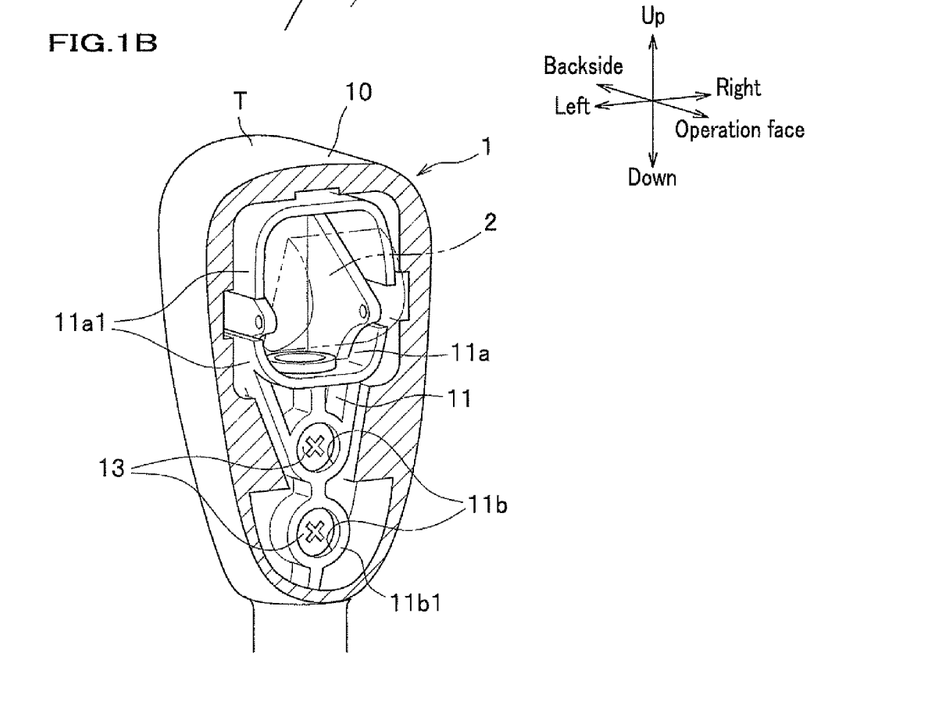
FIG. 1B is an illustration showing an inner structure of a lever knob.

FIG. 1A is a perspective view of an outer appearance of a shift operation device, and FIG. 1B is an illustration showing an inner structure of a lever knob. As shown in FIG. 1A, a shift operation device 100 of an automatic transmission according to the present embodiment is provided with, for example, a lever knob 1 that a driver grips on an upper end portion of a lever shaft 5. The lever knob 1 includes a shift button 2 which releases a shift lock of the shift operation device 100 and an overdrive button 3 which allows switching ON/OFF of an overdrive mode, and an outer cover 4 is fixed on the lever knob 1 so as to cover an inner structure of the lever knob 1.

As shown in FIG. 1B, the lever knob 1 is formed in such a manner that an outer casing 10 made of, for example, styrene-based thermoplastic elastomer covers a core 11 made of, for example, polyacetal. A hollow portion 11a is formed by a sidewall 11a1 of the core 11 on a side of a vertex portion T of the outer casing 10 in order to reduce a weight of the lever knob 1 and secure a space for housing the shift button 2. The sidewall 11a1 is disposed so as to surround the hollow portion 11a to ensure strength of the lever knob 1. Hereinafter, an up-and-down direction of the lever knob 1 is set so that a side of the vertex portion T of the outer casing 10 is the upper side. In addition, a side on which the shift button 2 is arranged is named as an operation face, and the opposite side thereof is named as a backside.

Figure 2A:
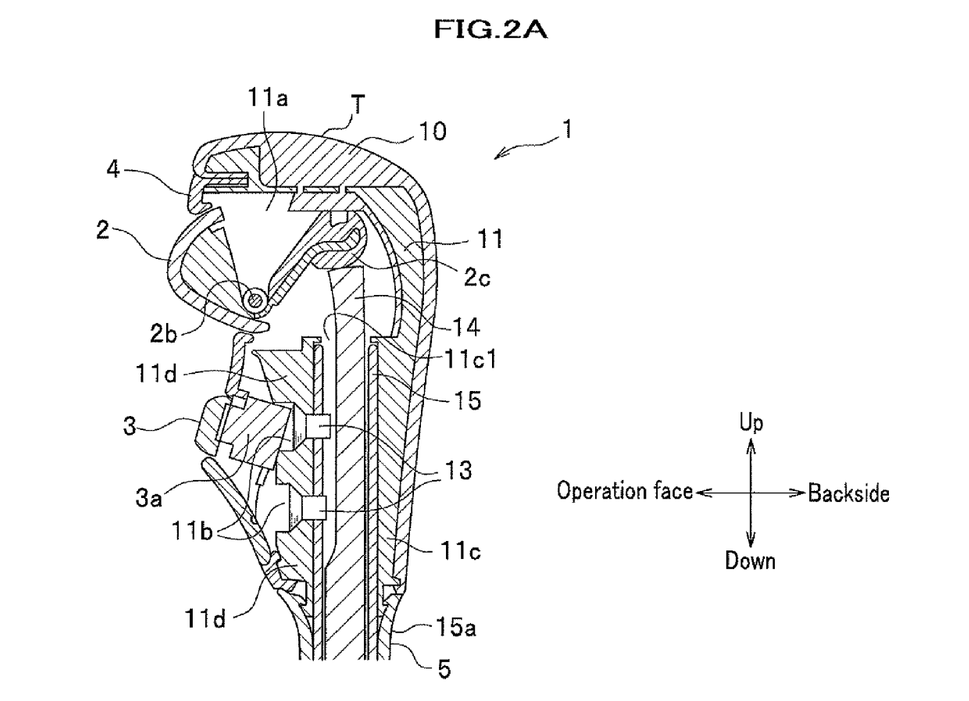
FIG. 2A is a cross sectional view of FIG. 1A taken along X-X line.

FIG. 2A is a cross sectional view of the shift lever of FIG. 1A taken along X-X line. As shown in FIG. 2A, an insertion portion 11c having a space portion 11c1 into which a lever main body 15 that is an axial portion of the lever shaft 5 is inserted is formed below the core 11 so as to extend downward from the hollow portion 11a. In addition, the lever main body 15 is inserted into the insertion portion 11c so that an upper end of the lever main body 15 is located below the hollow portion 11a. That is, the hollow portion 11a is formed on the upper end side of the lever shaft 5.

The lever main body 15 that is inserted into the insertion portion 11c is fixed to the insertion portion 11c with screws (screw members) 13 which are fitted up in a direction perpendicular to an axial direction of the lever main body 15, that is, the axial direction of the shaft 5. For this purpose, a screw cramp portion 11b is formed in the insertion portion 11c of the core 11.

As shown in FIG. 1B, the screw cramp portion 11b is formed so that the screw 13 is inserted into a cylindrical boss which is formed in the insertion portion 11c (see FIG. 2A), and includes a cylindrical portion 11b1 which is formed so as to surround the screw 13 and a through-hole not shown that a screw portion of the screw 13 passes though. Namely, the screw cramp portion 11b is the cylindrical boss.

A screw hole (not shown) with which the screw portion of the screw 13 is screwed together is formed in the lever main body 15, and as shown in FIG. 2A, the core 11 is fixed to the lever main body 15 with the screw 13. Meanwhile, the lever shaft 5 may be formed in such a manner that a lever main body 15 exposed outside from the outer casing 10 is covered by a cover member 15a made of, for example, resin as shown in FIG. 2A.

The insertion portion 11c is formed so as to connect to a lower side of the sidewall 11a1 (see FIG. 2B) of the hollow portion 11a, and the space portion 11c1 of the insertion portion 11c is formed passing through the side wall 11a1. Namely, the space portion 11c1 of the insertion portion 11c is formed so as to communicate with the hollow portion 11a.

As shown in FIG. 2A, the lever shaft 5 of the shift operation device 100 (see FIG. 1A) is a member connecting between an automatic transmission, not shown, and the lever knob 1, and includes the lever main body 15 having, for example, a pipe shape. A rod 14 for releasing a shift lock is provided in the space portion of the lever main body 15 of the lever shaft 5 in such a manner that the rod 14 freely moves through the space portion in the up-and-down direction, and an upper end of the rod 14 is projected into the hollow portion 11a of the core 11.

In addition, the hollow portion 11a of the core 11 is provided with the shift button 2 which moves the rod 14 in the up-and-down direction.

Figure 2B:
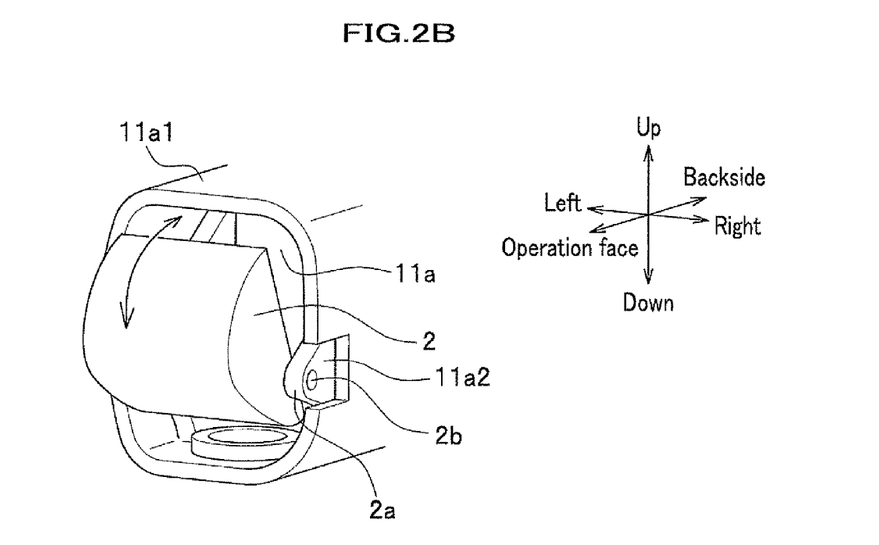
FIG. 2B is an enlarged view of a hollow portion.

FIG. 2B is an enlarged view of the hollow portion. As shown in FIG. 2B, a hinge portion 2a supporting the shift button 2 is formed standing in the hollow portion 11a ranging from a back side of the exterior portion 11e (see FIG. 3A) forming an outer appearance of a backside of the core 11 to the up-and-down direction. Two hinge portions 2a described above are formed so as to sandwich the shift button 2, and the shift button 2 is swingably supported by the two hinge portions 2a through a rotation shaft 2b.

In addition, in order to avoid interference with a projecting end portion of the rotation shaft 2b from the hinge portion 2a, two recesses 11a2 are formed in the sidewall 11a1.

As shown in FIG. 2A, an arm 2c which operates together with the shift button 2 is provided in the shift button 2, and if the shift button 2 swings around the rotation shaft 2b, the arm 2c swings together with the shift button 2 around the rotation shaft 2b. In the embodiment, the arm 2c is configured in such a manner that if the shift button 2 is pushed toward a back side of the lever knob 1, the arm 2c moves downward. In addition, the upper end of the rod 14 and the arm 2c are configured to come in contact with each other, and if the shift button 2 rotates in a direction that the shift button 2 is pushed into the core 11, the rod 14 moves downward by the arm 2c.

Namely, if the driver operates the shift button 2 to be pushed into the lever knob 1, the rod 14 moves downward.

Then, if the shift operation device 100 (see FIG. 1A) is configured so that a shift lock is released when the rod 14 moved downward, the shift lock of the shift operation device 100 is released if the driver operates the shift button 2. In addition, if the rod 14 is configured to be pushed upward by a pushing means not shown, the arm 2c is pushed upward by the rod 14, and the shift button 2 is pushed in a direction to project toward the operation face from the lever knob 1.

In addition, an overdrive button 3 is provided in the lever knob 1. For example, a push switch 3a which switches ON/OFF of an electric connection may be used for the overdrive button 3. Namely, the overdrive button 3 may be provided in such a manner that the push switch 3a is fixed to, for example, the core 11 by a fixing means not shown so that the operation portion protrudes from the operation face side of the lever knob 1 and the driver can operate the operation portion.

Meanwhile, common technologies may be used for the shift lock and the overdrive button 3 (see FIG. 2A) of the shift operation device 100 (see FIG. 1A), and the explanation thereof in detail will be omitted.

In addition, a method for mounting the outer cover 4 shown in FIG. 2A is not limited, and for example, by forming an engagement click not shown in the outer cover 4 and an engagement hole not shown in the core 11, the engagement click in the outer cover 4 may be engaged with the engagement hole in the core 11.

FIG. 1A, FIG. 1B, FIG. 2A, and FIG. 2B exemplify a selector lever of an automatic transmission, as the shift operation device 100 (see FIG. 1A). When the embodiment of the present invention is applied to a shift lever of a manual transmission, the overdrive button 3 including the push switch 3a, the shift button 2, the arm 2c, and the rod 14 which are shown in FIG. 2A may be eliminated. In addition, the hinge portion 2a (see FIG. 2B) supporting the shift button 2 may be eliminated. In this case, the recess 11a2 may be formed as a weak portion described later.

Figure 3A:
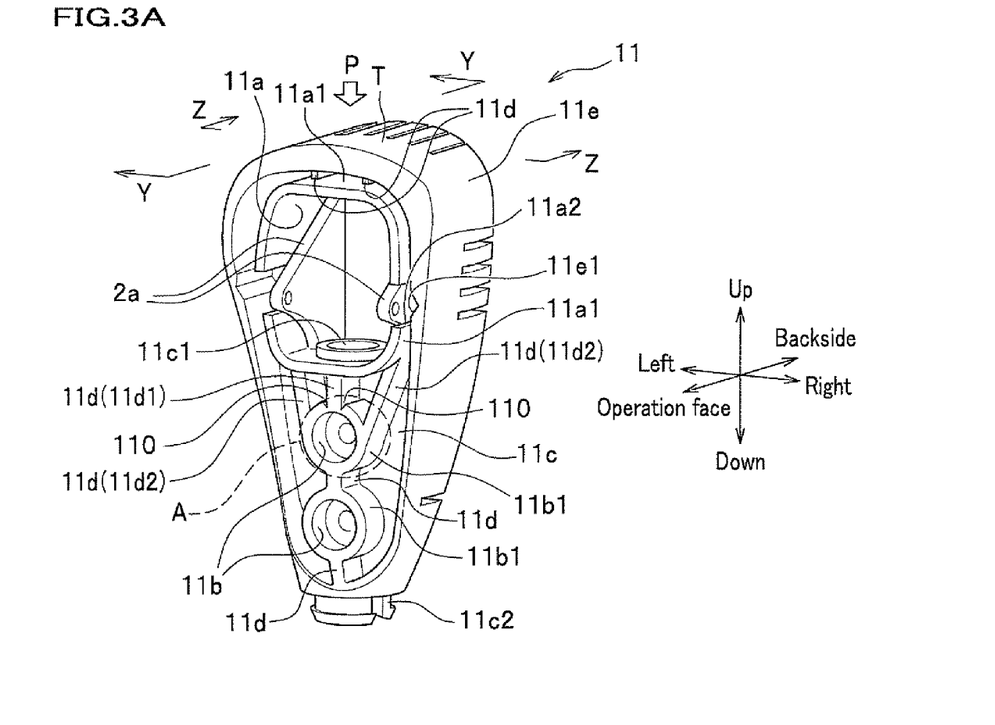
FIG. 3A is a perspective view showing a core of a lever knob according to an embodiment of the present invention.
Figure 3B:
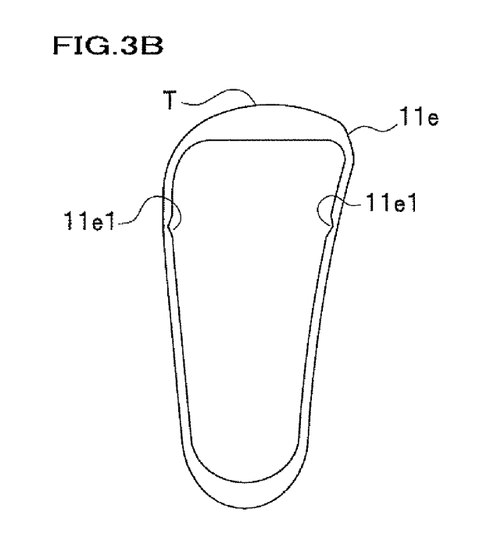
FIG. 3B is an illustration of an exterior portion as seen from an operation face side.
Figure 3C:
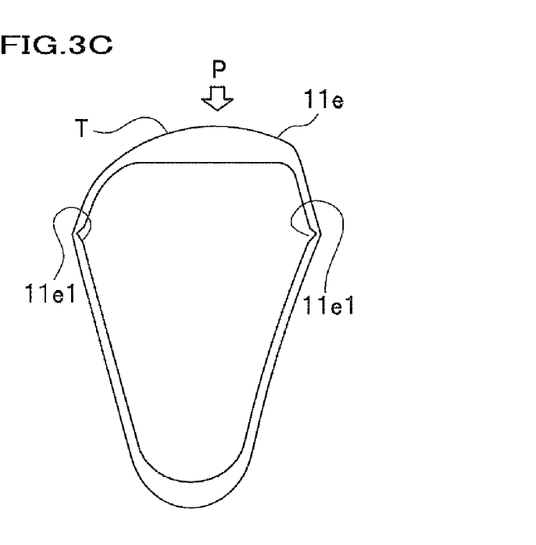
FIG. 3C is an illustration showing a deformation of the exterior portion.

FIG. 3A is a perspective view showing a core of a lever knob according to the embodiment of the present invention, FIG. 3B is an illustration of an exterior portion as seen from an operation face side, and FIG. 3C is an illustration showing a deformation of the exterior portion. As shown in FIG. 3A, in the core 11, the exterior portion 11e which is a box having a bottom and whose operation face side is opened forms an outer appearance of a backside of the core 11, and, for example, the hollow portion 11a, the two screw cramp portions 11b, 11b, and the insertion portion 11c are formed inside the opening of the exterior portion 11e.

In the upper side (side of vertex portion T) inside the opening of the exterior portion 11e, the sidewall 11a1 stands toward the operation face side from the backside to form the hollow portion 11a having substantially a rectangular shape as seen from the operation face side. The insertion portion 11c is formed on the lower side of the sidewall 11a1.

The exterior portion 11e and the sidewall 11a1 form an outer circumferential portion.

On the back side inside the opening of the exterior portion 11e, the insertion portion 11c is formed as a ridge protrusion extending in the up-and-down direction. The insertion portion 11c is formed so that one end of the ridge protrusion is connected to the lower side of the sidewall 11a1, and a space portion 11c1 into which the lever main body 15 (see FIG. 2A) is inserted is formed in the ridge protrusion along the protrusion. The space portion 11c1 of the insertion portion 11c is formed so as to penetrate the sidewall 11a1, and the hollow portion 11a communicates with the space portion 11c1 of the insertion portion 11c.

In addition, the other end, which is not connected to the sidewall 11a1, of the insertion portion 11c may be projected from the lower side of the exterior portion 11e to form, for example, an engagement portion 11c2 engaging with a cover member 15a (see FIG. 2A) covering the lever main body 15 (see FIG. 2A).

In the ridge protrusion of the insertion portion 11c, for example, two screw cramp portions 11b each consisting of a cylindrical boss are arranged along the insertion portion 11c so as to open to the operation face side. That is, the sidewall 11a1 and the screw cramp portions 11b, 11b are formed in line along the insertion portion 11c. In other words, the sidewall 11a1 and the screw cramp portions 11b, 11b are formed in line in the axial direction of the lever main body 15 (see FIG. 2A) to be inserted into the insertion portion 11c, that is, in the axial direction of the lever shaft 5 (see FIG. 2A).

As described above, the screw cramp portion 11b consists of a cylindrical boss, and includes a cylinder portion 11b1 surrounding a screw 13 shown in FIG. 2A. The cylindrical portion 11b1 of the upper screw cramp portion 11b and the cylindrical portion 11b1 of the lower screw cramp portion 11b are connected by a stiffening rib 11d which is formed on a line connecting between substantially centers of respective screw cramp portions.

In addition, the cylindrical portion 11b1 of the lower screw cramp portion 11b is connected to the exterior portion 11e by the stiffening rib 11d.

Further, an upper portion of the sidewall 11a1 forming the hollow portion 11a is connected to the exterior portion 11e by the stiffening rib 11d.

The screw cramp portion 11b consists of a cylindrical boss opening to the operation face side, and the sidewall 11a1 stands toward the operation face side from a back side of the exterior portion 11e. Therefore, the sidewall 11a1 is formed to stand in a height direction of the screw cramp portion 11b.

Then, the cylindrical portion 11b1 of the upper screw cramp portion 11b is connected to the lower side of the sidewall 11a1 forming the hollow portion 11a by the stiffening rib 11d.

The cylindrical portion 11b1 of the upper screw portion 11b and the sidewall 11a1 are connected by a single stiffening rib 11d (center rib 11d1) which is formed on a line along the insertion portion 11c through substantially the center of the screw cramp portion 11b and by two stiffening ribs 11d, 11d (side ribs 11d2, 11d2) which are formed toward respective lower corners of the sidewall 11a1 from the cylindrical portion 11b1. In other words, the center rib 11d1 is formed in the axial direction of the lever main body 15 (see FIG. 2A), that is, in the axial direction of the lever shaft 5 (see FIG. 2A).

In the core 11, the lower side of the sidewall 11a1 forming the hollow portion 11a and the cylindrical portion 11b1 of the upper screw cramp portion 11b are connected by the stiffening rib 11d, the cylindrical portion 11b1 of the upper screw cramp portion 11b and the cylindrical portion 11b1 of the lower screw cramp portion 11b are connected by the by the stiffening rib 11d, and the cylindrical portion 11b1 of the lower screw cramp portion 11b and the exterior portion 11e are connected by the stiffening rib 11d. In addition, as shown in FIG. 3A, the exterior portion 11e and the upper side of the sidewall 11a1 forming the hollow portion 11a are connected by the stiffening rib 11d. The structure as described above ensures a strength of the core 11 against a load operating in the axial direction of the lever main body 15 (see FIG. 2A), that is, in the axial direction (hereinafter, referred to as up-and-down direction) of the lever shaft 5 (see FIG. 2A). In addition, a V-shaped cut-out groove 110 formed in a height direction of the cylindrical portion 11b1 is disposed in a connection portion between the center rib 11d1 and the cylindrical portion 11b1 of the upper screw cramp portion 11b. The V-shaped cut-out groove 110 will be described later in detail.

Meanwhile, the number of the screw cramp portions 11b is not limited, and may be one, or may be more than two. If the number of the screw cramp portions 11b is more than two, the cylindrical portion 11b1 of each of the screw cramp portions may be connected by the stiffening rib 11d.

In addition, the screw cramp portions 11b which is formed to be closest to the sidewall 11a1 of the hollow portion 11a and the lower side of the sidewall 11a1 may be connected by one center rib 11d1 and two side ribs 11d2, 11d2.

The lever knob 1 (see FIG. 1A) according to the embodiment of the present invention is provided with a weak portion in the core 11 (see FIG. 1B), and if a load (for example, impact load) exceeding a predetermined value and operating in the up-and-down direction is applied in the axial direction of the lever shaft 5 (see FIG. 2A) from the vertex portion T of the lever knob 1, the core 11 is crashed at the weak portion to absorb the load.

Meanwhile, the predetermined value may be set as appropriated based on, for example, vehicle performances required for the vehicle provided with the shift operation device 100 (see FIG. 1A).

As shown in FIG. 3A, on a wall inside the opening of the exterior portion 11e of the core 11 according to the embodiment, a V-shaped groove (concave groove) 11e1 is formed at a position, for example, facing the recess 11a2 of the sidewall 11a1 in a groove-like shape toward the back side from the operation face side. Namely, the V-shaped groove 11e1 is formed along a standing direction of the sidewall 11a1. The V-shaped groove 11e1 may be one, or may be more than one. The V-shaped groove 11e1 described above is disposed on each side of the hollow portion 11a as seen from the operation face side as shown, for example, in FIG. 3A and FIG. 3B.

Meanwhile, a depth of the V-shaped groove 11e1 from the operation face may beset as appropriate based on, for example, the strength required for the core 11.

If a load P operating in the up-and-down direction is applied to the vertex portion T of the exterior portion 11e, a stress occurs in the exterior portion 11e. In this case, as shown in FIG. 3B, a stress concentration occurs in the formed V-shaped groove 11e1, and as shown in FIG. 3C, deformation and breaking of the exterior portion 11e originate from the V-shaped groove 11e1.

Since a portion of the V-shaped groove 11e1 is formed to be thin, as shown in FIG. 3A, a thin portion due to the exterior portion 11e is formed around the hollow portion 11a. In addition, the V-shaped groove 11e1 causes deformation and breaking of the exterior portion 11e, and accordingly, the V-shaped groove 11e1 forms a weak portion (second weak portion).

In addition, the core 11 according to the embodiment is provided with a thin portion in a standing portion of the sidewall 11a1.

Figure 4A:
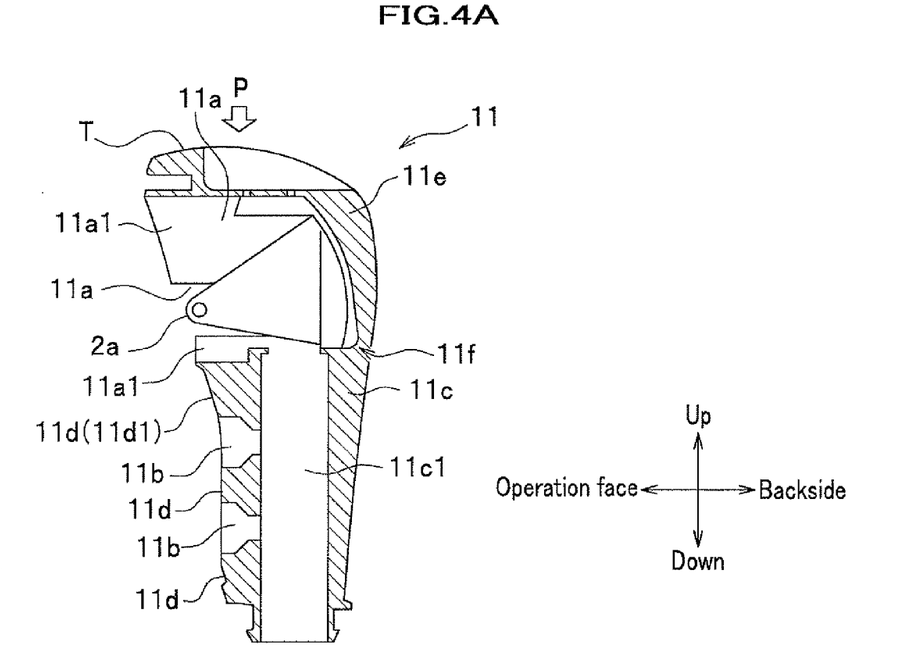
FIG. 4A is a cross sectional view of FIG. 3A taken along Y-Y line.
Figure 4B:
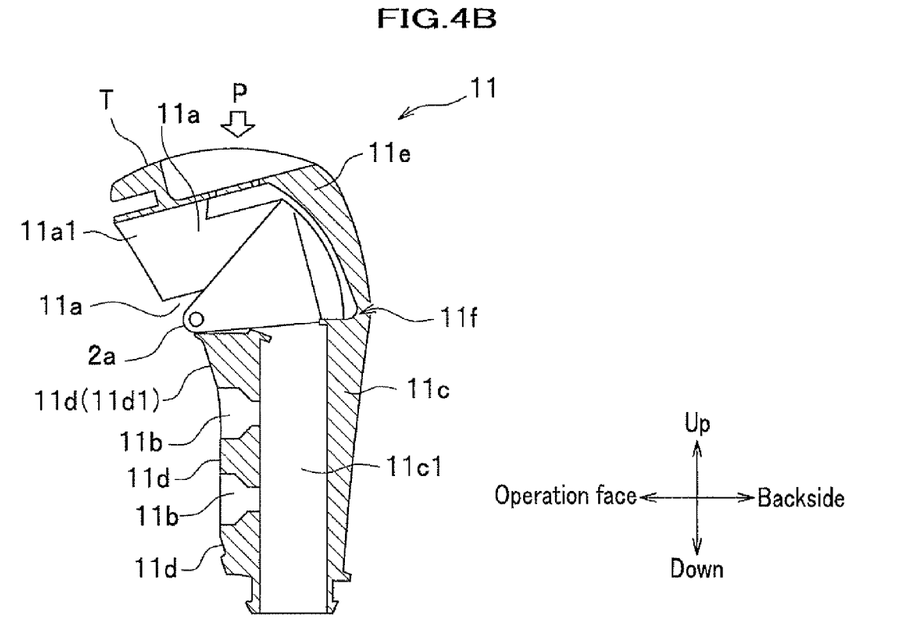
FIG. 4B is a schematic illustration showing a state in that a core deforms at a thin portion.

FIG. 4A is a cross sectional view of FIG. 3A taken along Y-Y line, and FIG. 4B is a schematic illustration showing a state in that a core deforms at a thin portion. As shown in FIG. 4A, the hollow portion 11a is formed so that an outer periphery portion including the exterior portion 11e of the core 11 becomes to be thin. In addition, a connection portion between the sidewall 11a1 of the hollow portion 11a and the exterior portion 11e is formed to be further thinner to form a thin portion 11*f*. Namely, the standing portion of the sidewall 11*a*1 of the core 11 is formed to be thin.

If the load P operating in the up-and-down direction is applied to the vertex portion T of the exterior portion 11*e*, a stress occurs in the exterior portion 11*e*, and a stress concentration occurs at the connection portion between the sidewall 11*a*1 and the exterior portion 11*e*. In the embodiment, the thin portion 11*f* is disposed in the connection portion where the stress concentration occurs between the sidewall 11*a*1 and the exterior portion 11*e* so that the deformation and breaking of the core 11 originate from the thin portion 11*f*.

As shown in FIG. 4B, if the load P operating in the up-and-down direction is applied to the vertex portion T of the core 11 configured as described above, a stress occurs in the core 11, and stress concentrations occur at the thin portion 11*f* and at a vertex angle portion of the V-shaped groove 11*e*1 (see FIG. 3A) formed in the exterior portion 11*e*. In addition, the stress occurred in the core 11 is transferred to the sidewall 11*a*1, and a stress concentration occurs at the recess 11*a*2 (see FIG. 3A). If the stress occurred in the core 11 exceeds the predetermined value, the recess 11*a*2 of the sidewall 11*a*1 deforms in the up-and-down direction to be crashed and broken.

In addition, as shown in FIG. 3C, the exterior portion 11*e* deforms to break at the V-shaped groove 11*e*1, as well as the thin portion 11*f* breaks as shown in FIG. 4B. As a result, the load P, which was applied to the core 11, operating in the up-and-down direction is absorbed through the breaking of the core 11.

Meanwhile, when the load P operating in the up-and-down direction is applied to the vertex portion T of the core 11 and the core 11 breaks at the weak portions, the vertex portion T of the core 11 deforms to be depressed into the hollow portion 11*a*. Therefore, the hollow portion 11*a* serves to absorb the deformation of the core 11.

Figure 5A:
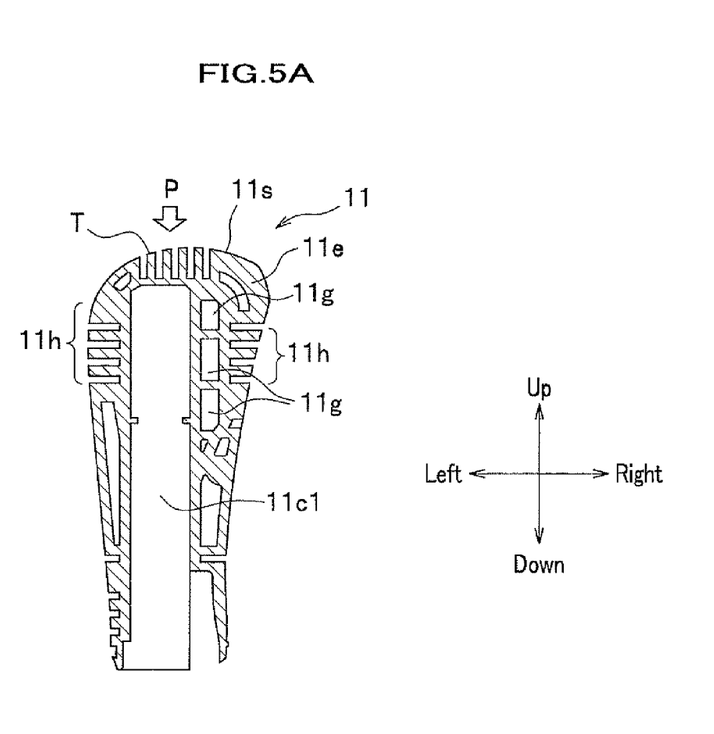
FIG. 5A is a cross sectional view of FIG. 3A taken along Z-Z line, which is a backside of a core as seen from an operation face side.
Figure 5B:
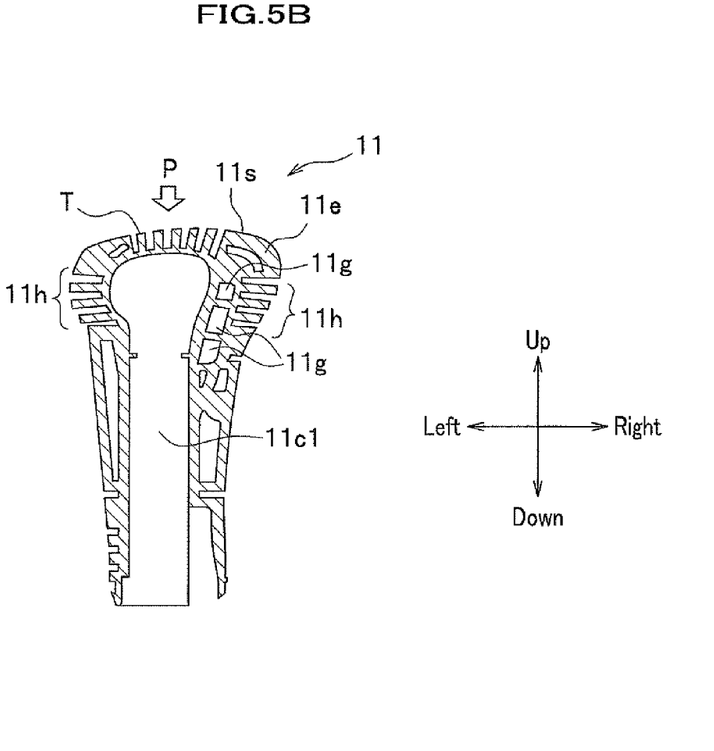
FIG. 5B is a schematic illustration showing a state that the core deforms at a weak portion on the backside of the core.

The core 11 according to the embodiment may have a weak portion on the back side thereof. FIG. 5A is a cross sectional view of FIG. 3A taken along Z-Z line, which is a backside of a core as seen from the operation face side, and FIG. 5B is a schematic illustration showing a state in that the core deforms at a weak portion on the back side of the core. As shown in FIG. 5A, a plurality of space portions 11*g* (three in FIG. 5A) are formed on the back side of the exterior portion 11*e* of the core 11 by emptying the exterior portion 11*e*. In addition, a plurality of groove portions 11*h* (four in FIG. 5A) are formed on an outer wall surface 11*s* of the exterior portion 11*e* in a direction, for example, toward the back side from the operation face side.

The space portions 11*g* and the groove portions 11*h* formed as described above form weak portions in the case that the load P operating in the up-and-down direction is applied to the vertex portion T of the core 11.

Namely, a thin portion is formed in the core 11 by forming the plurality of the groove portions 11*h* on the outer wall surface 11*s* of the exterior portion 11*e* of the core 11. Then, if the load P operating in the up-and-down direction is applied to the vertex portion T, the thin portions due to the groove portions 11*h* and the space portions 11*g* deform to form origins of breaking of the core 11 as shown in FIG. 5B.

In addition, in the embodiment, a weak portion is also formed in the screw cramp portion 11*b* (see FIG. 3A) of the core 11 (see FIG. 3A).

Figure 6:
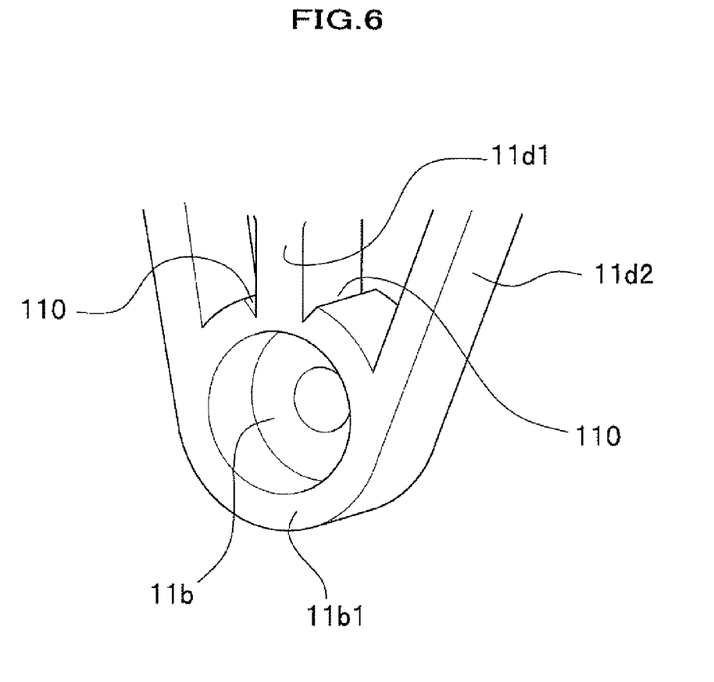
FIG. 6 is an enlarged view of an A portion of FIG. 3A.

FIG. 6 is an enlarged view of an A portion of FIG. 3A. As shown in FIG. 6, V-shaped cut-out grooves 110 which are formed in the height direction of a boss forming the screw cramp portion 11*b* are formed in the connection portion between the cylindrical portion 11*b*1 of the upper screw cramp portion 11*b* and the center rib 11*d*1. By forming the V-shaped cut-out grooves 110 as described above, the cylindrical portion 11*b*1 at the connection portion connecting with the center rib 11*d*1 can be formed thinner than the other portions of the cylindrical portion 11*b*1.

For example, when the load P operating in the up-and-down direction is applied to the center rib 11*d*1 and a stress occurs in the connection portion between the center rib 11*d*1 and the cylindrical portion 11*b*1 by the load, stress concentrations occur at the thin portions of the cylindrical portion 11*b*1.

Then, if a stress exceeding a predetermined value occurs in the connection portion between center rib 11*d*1 and the cylindrical portion 11*b*1, the cylindrical portion 11*b*1 of the screw cramp portion 11*b* is broken by a stress concentration occurred in the thin portion. In addition, since the cut-out grooves 110 are formed in a V shape, a large stress concentration occurs at the V-shaped vertex angle portion, and accordingly, the cylindrical portion 11*b*1 is effectively broken.

As shown in FIG. 3A, if the load P operating in the up-and-down direction is applied to the vertex portion T of the core 11, a stress occurs in the core 11, and the stress is transferred to the inner structure of the core 11 to generate a stress operating in the up-and-down direction in the center rib 11*d*1.

Therefore, if the load P operating in the up-and-down direction and exceeding a predetermined value is applied to the vertex portion T of the core 11 (see FIG. 3A), a stress operating in the up-and-down direction and exceeding a predetermined value occurs in the center rib 11*d*1. Then, the upper screw cramp portion 11*b* breaks starting from the cut-out grooves 110 to absorb the load applied to the core 11.

Accordingly, the V-shaped cut-out grooves 110 also form weak portions (first weak portion) of the core 11.

Meanwhile, a shape of the cut-out grooves 110 is not limited to a V shape, and, for example, a rectangular shape or a semicircular shape may be used. Other than those, the shape is not limited as long as at least one part of the cylindrical portion 11*b*1 is formed to be thinner than the other parts.

Figure 7:
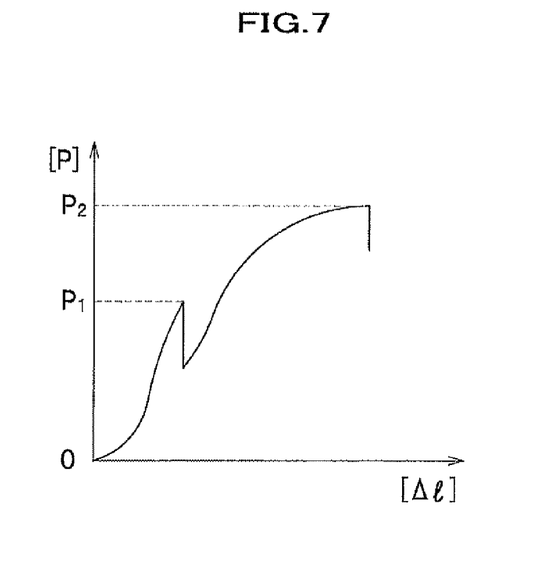
FIG. 7 is a graph showing a relationship between a load to be applied on a core and an amount of deformation of the core.

FIG. 7 is a graph showing a relationship between a load applied on a core and an amount of deformation of the core. As shown in FIG. 7, when the load P (compressive load) operating in the up-and-down direction is applied to the vertex portion T of the core 11 (see FIG. 3A) and increased, a deformation amount $\Delta l$ of the core 11 increases as the load P increases. If the applied load P reaches $P_1$, the screw cramp portion 11*b* (see FIG. 3A) of the core 11 breaks at the cut-out grooves 110 (see FIG. 3A).

With respect to the hollow portion 11*a* (see FIG. 3A), since the outer circumferential portion of the core 11 is formed to be thin, the core 11 deforms to expand to right and left direction in the hollow portion 11*a*. Therefore, a force which deforms the cut-out grooves 110 in the right and left direction is increased, thereby resulting in easy breaking of the core 11. In addition, by forming the V-shaped grooves 11*e*1 (see FIG. 3A) in the exterior portion 11*e*, the core 11 expands easily to right and left, thereby resulting in further easy breaking of the core 11.

When the load P applied to the core 11 is further increased, the deformation amount $\Delta l$ of the core 11 increases, and if the applied load P reaches $P_2$ which is larger than $P_1$, the vertex portion T of the core 11 deforms to be depressed into the hollow portion 11*a* to be broken, as shown in FIG. 4B.

As described above, a strength of the core 11 is designed in such a manner that when the applied load P to the core 11 (see FIG. 4A) is increased, the screw cramp portion 11*b* (see FIG. 3A) breaks first at the cut-out grooves 110 (see FIG. 3A), and the applied load p is further increased, the hollow portion 11*a*

(see FIG. 3A) breaks next at the V-shaped grooves 11e1 (see FIG. 3A) of the exterior portion 11e and at the thin portions 11f (see FIG. 4A). As a result, if the load P applied to the vertex portion T of the core 11 is, for example, an impact load, the core 11 can absorb the initial impact load through breaking of the screw cramp portion 11b, and the secondary impact load following the initial impact load through the breaking of the hollow portion 11a.

Namely, the shift operation device 100 (see FIG. 1A) according to the embodiment is provided with the weak portions in the core 11 (see FIG. 3A) forming the lever knob 1 (see FIG. 1A), and when a load operating in the up-and-down direction and exceeding the predetermined value is applied to the vertex portion of the lever knob 1 as an impact load, the inner structure of the lever knob 1 breaks. Therefore, the initial impact load and the secondary impact load following the initial impact load can be effectively absorbed through the breaking of the lever knob 1, accordingly.

In addition, by providing the hollow portion 11a (see FIG. 3A), an outer periphery portion including the exterior portion 11e (see FIG. 3A) of the core 11 (see FIG. 3A) is formed to be thin so as to expand easily to right and left, thereby, a breaking of the core 11 through deformation of the core 11 in the right and left direction can be easily achieved by expansion of the hollow portion 11a and the weak portions. Therefore, the lever knob 1 (see FIG. 1A) can absorb the impact load operating in the axial direction of the lever shaft 5 (see FIG. 1A) with a simple structure.

In addition, since the core 11 of the lever knob 1 has a structure that easily deforms in the right and left direction to be broken at the hollow portion 11a, the connection portion between the center rib 11d1 (see FIG. 6) and the cylindrical portion 11b1 easily breaks to right and left at the cut-out grooves 110 (see FIG. 6). As described above, an impact load operating in the axial direction of the lever shaft 5 can be absorbed through the breaking of the connection portion between the center rib 11d1 and the cylindrical portion 11b1.

Furthermore, since the core 11 deforms in the right and left direction to be broken by a load in the axial direction, a structure such as a shift button 2 (see FIG. 2B) may be arranged in the hollow portion 11a.

It is noted that the load $P_1$ with which the screw cramp portion 11b (see FIG. 3A) breaks at the cut-out grooves 110 (see FIG. 3A), the load $P_2$ with which the hollow portion 11a (see FIG. 3A) breaks at the V-shaped grooves 11e1 (see FIG. 3A) and at the thin portion 11f (see FIG. 4A), and the deformation amount Δl by the applied load P are not limited specifically, and may be set as appropriate based on vehicle performances required for the vehicle.

In addition, in the embodiment, the screw cramp portion 11b (see FIG. 3A) breaks first at the cut-out grooves 110 (see FIG. 3A), and if the applied load P is further increased, the hollow portion 11a (see FIG. 3A) breaks at the V-shaped grooves 11e1 (see FIG. 3A) of the exterior portion 11e and at the thin portions 11f (see FIG. 4A). However, the order of breaking is not limited to this, and the hollow portion 11a (see FIG. 3A) may break first at the V-shaped grooves 11e1 of the exterior portion 11e and at the thin portions 11f.

What is claimed is:

1. A shift operation device, comprising: a lever shaft configured to be supported in a vehicle: a lever knob provided in an upper end portion of the lever shaft; the lever knob comprising: an outer casing, a core member disposed inside of the outer casing and fixed to the upper end portion of the lever shaft, the core member comprising a reinforcing frame, and a hollow box portion attached to the reinforcing frame; the hollow box portion comprising a sidewall and an outer periphery portion; and a connection member for fixing the core member to the lever shaft; wherein said hollow box portion is provided above the lever shaft, the outer casing comprising an outer periphery portion formed to be thin by disposing the hollow box portion therein, wherein the reinforcing frame of the core member comprises: a cylindrical boss for receiving the connection member therein, the cylindrical boss disposed below the sidewall of the box portion and having a central axis which extends substantially perpendicular to an axial direction of the lever shaft, and a stiffening rib connecting the cylindrical boss and the sidewall, the cylindrical boss having at least one cutout groove formed therein proximate the stiffening rib and denning a first weak portion for receiving a load caused by a deformation of the outer periphery portion, wherein a portion of the cylindrical boss, where the cutout groove is formed, is thinner than other, adjacent portions of the cylindrical boss, and wherein the outer periphery portion is configured to be capable of being deformed by a load operating in the axial direction of the lever shaft.

2. The shift operation device according to claim 1, wherein the connection member comprises a screw; wherein the screw is inserted into the cylindrical boss in a direction perpendicular to the axial direction of the lever shaft; wherein the cylindrical boss and the hollow box portion are arranged in line in the axial direction of the lever Shaft, and the cylindrical boss and the sidewall are connected by the stiffening rib, and wherein the first weak portion is disposed in a connection portion between the cylindrical boss and the stiffening rib.

3. The shift operation device according to claim 1, wherein the outer periphery portion of the outer casing is provided with at least one groove formed therein, defining a second weak portion which is weak against a load operating in the axial direction of the lever shaft in the outer periphery portion of the outer casing surrounding the hollow box portion.

4. The shift operation device according to claim 2, wherein the outer periphery portion of the outer casing is provided with at least one groove formed therein, defining a second weak portion which is weak against a load operating in the axial direction of the lever shaft in the outer periphery portion of the outer casing surrounding the hollow box portion.

5. The shift operation device according to claim 3, wherein the outer periphery portion of the outer casing is provided with at least one groove formed therein, defining a second weak portion which is weak against a load operating in the axial direction of the lever shaft in the outer periphery portion of the outer casing surrounding the hollow box portion.

6. The shift operation device according to claim 4, wherein the outer periphery portion of the outer casing is provided with the second weak portion by forming a concave groove in the outer periphery portion on opposite sides of the hollow box portion.

7. The shift operation device according to claim 2,
wherein the outer periphery portion of the outer casing has a thin portion formed therein which is weak against a load operating in the axial direction of the lever shaft, said thin portion disposed in a connection portion between the sidewall and the outer periphery portion.

8. The shift operation device according to claim 2, wherein a space portion which is weak against a load operating in the axial direction of the lever shaft is disposed by emptying a part of the outer periphery portion.

9. The shift operation device according to claim 7, wherein a space portion which is weak against a load operating in the axial direction of the lever shaft is disposed by emptying a part of the outer periphery portion.

10. The shift operation device according to claim 2, wherein a groove portion which is weak against a load operating in the axial direction of the lever shaft is disposed on an outer wall surface of the outer periphery portion.

11. The shift operation device according to claim 7, wherein a groove portion which is weak against a load operating in the axial direction of the lever shaft is disposed on an outer wall surface of the outer periphery portion.

12. The shift operation device according to claim 8, wherein a groove portion which is weak against a load operating in the axial direction of the lever shaft is disposed on an outer wall surface of the outer periphery portion.

13. The shift operation device according to claim 9, wherein a groove portion which is weak against a load operating in the axial direction of the lever shaft is disposed on an outer wall surface of the outer periphery portion.

14. The shift operation device according to claim 1, wherein the stiffening rib comprises:
- a center rib formed in the axial direction of the lever shaft; and
- a plurality of side ribs, between which the center rib is formed,
- wherein the cutout groove is formed at a connection portion between the cylindrical boss and the center rib.

* * * * *